A. P. ANDERSON.
APPARATUS FOR PUFFING STARCH CONTAINING MATERIAL.
APPLICATION FILED AUG. 3, 1906.
1,035,840. Patented Aug. 20, 1912.
9 SHEETS—SHEET 1.
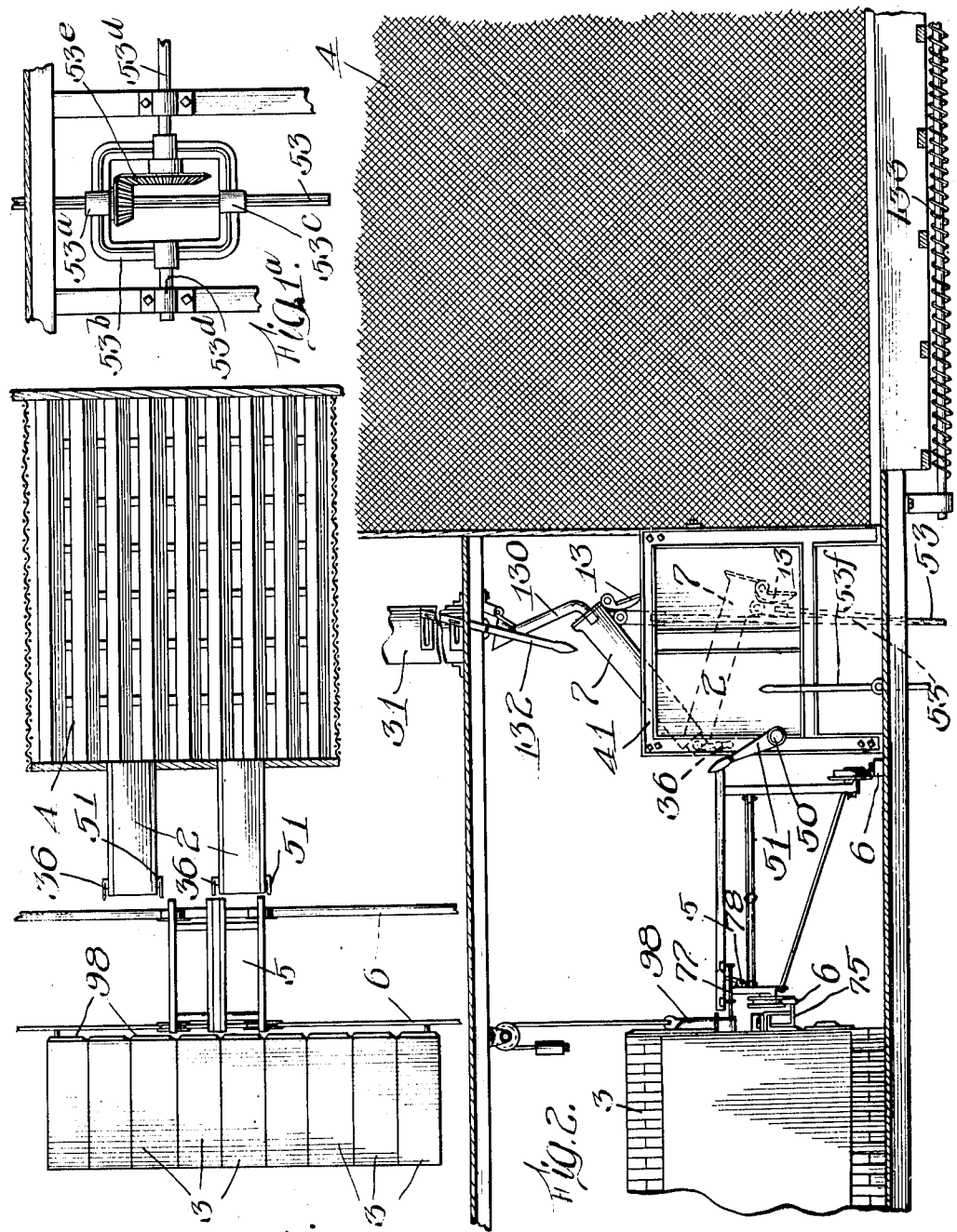

A. P. ANDERSON.
APPARATUS FOR PUFFING STARCH CONTAINING MATERIAL.
APPLICATION FILED AUG. 3, 1906.
1,035,840.
Patented Aug. 20, 1912.
9 SHEETS—SHEET 2.
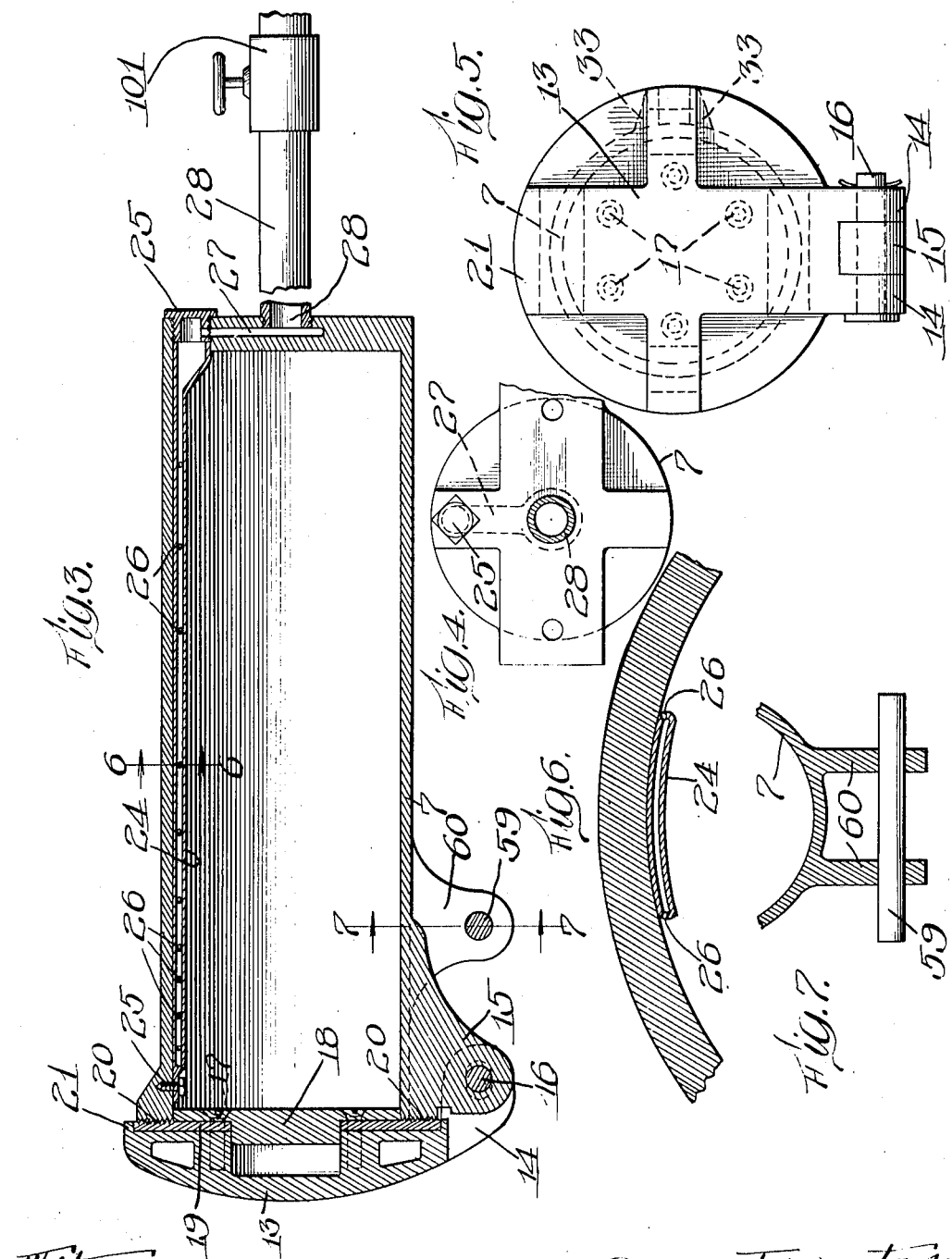

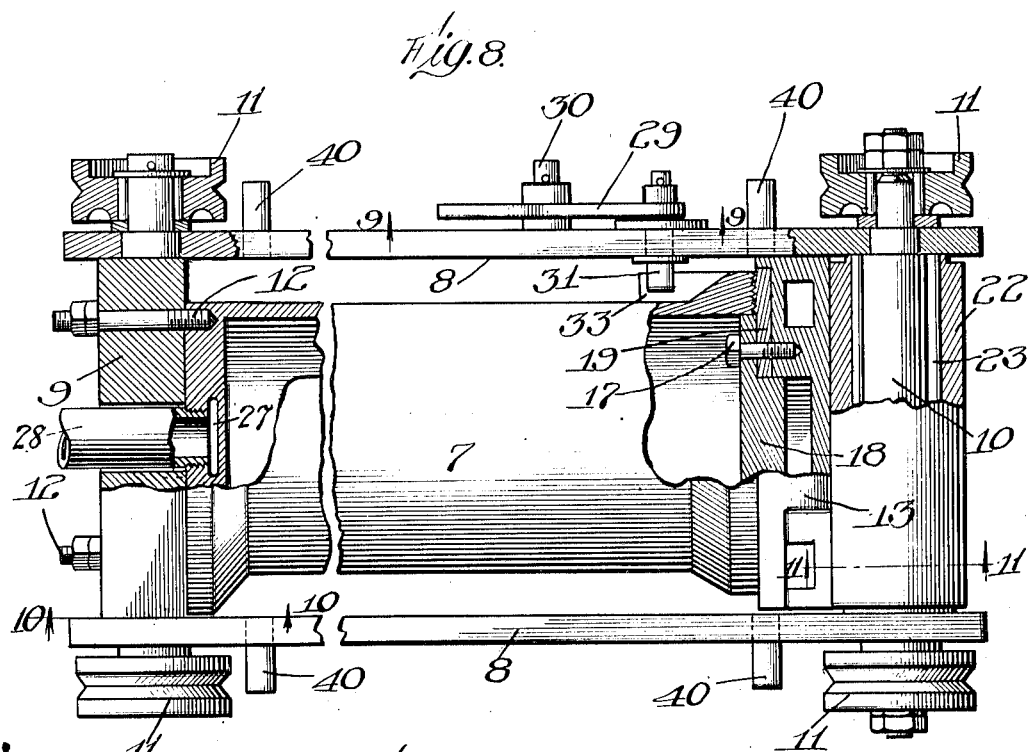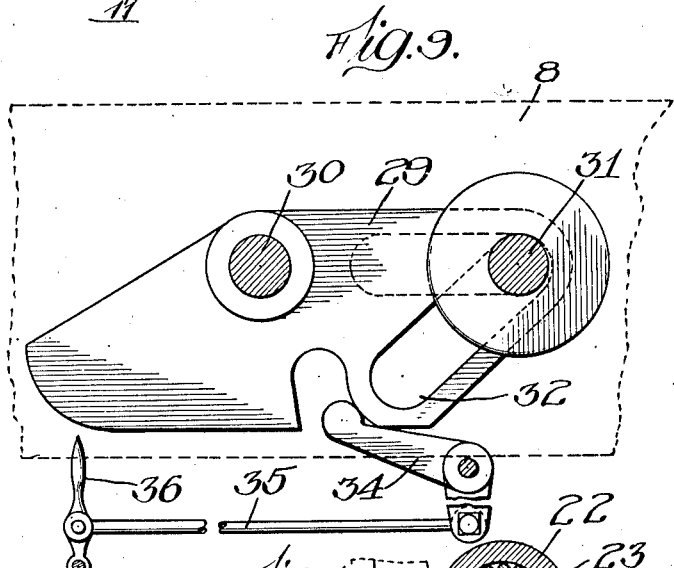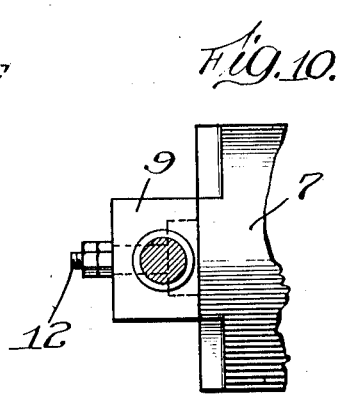

A. P. ANDERSON.
APPARATUS FOR PUFFING STARCH CONTAINING MATERIAL.
APPLICATION FILED AUG. 3, 1906.
1,035,840.
Patented Aug. 20, 1912.
9 SHEETS—SHEET 4.
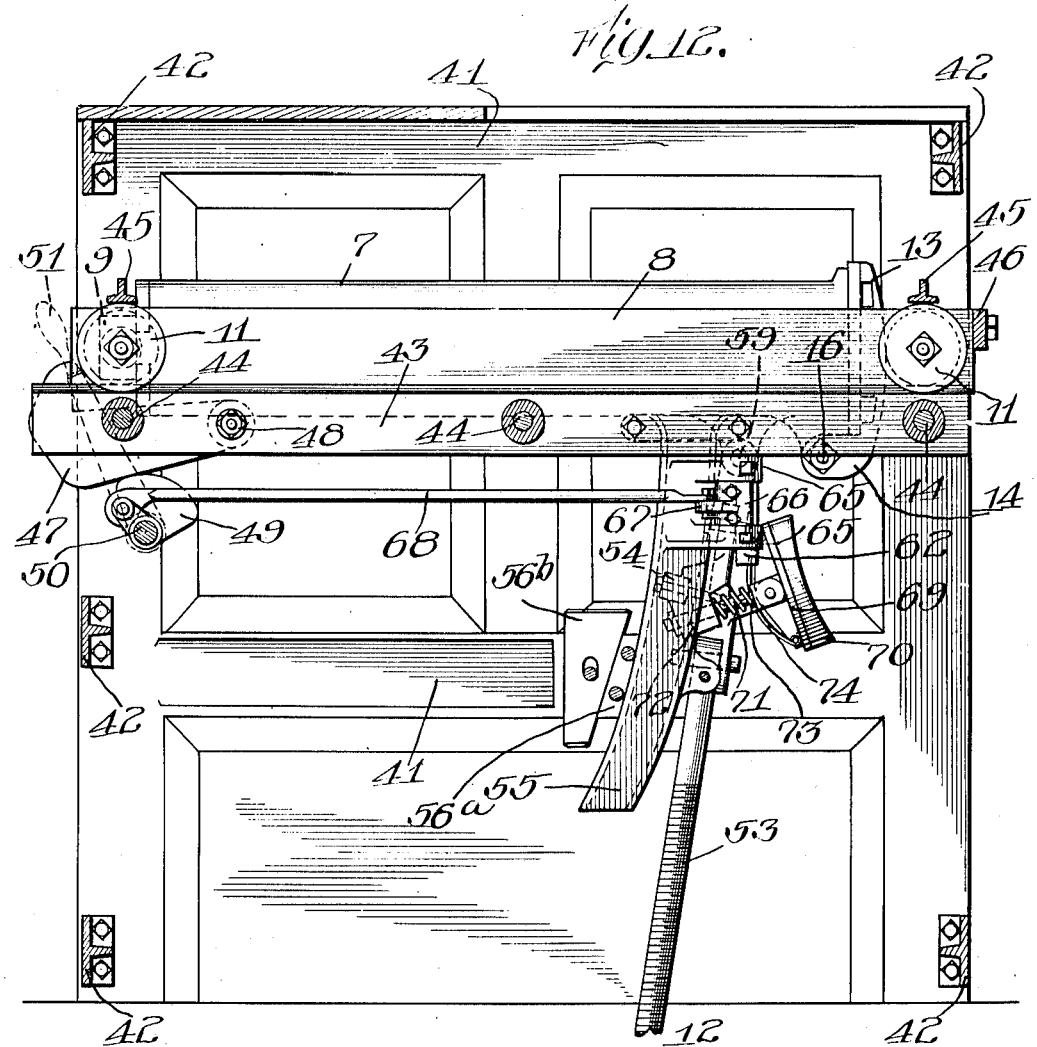
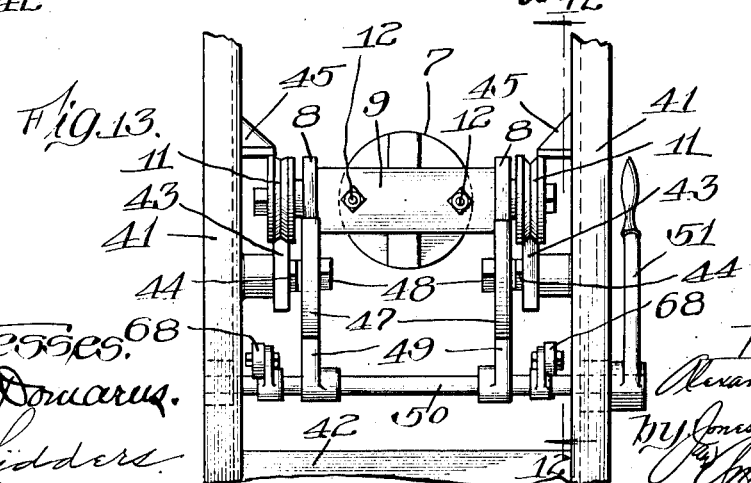

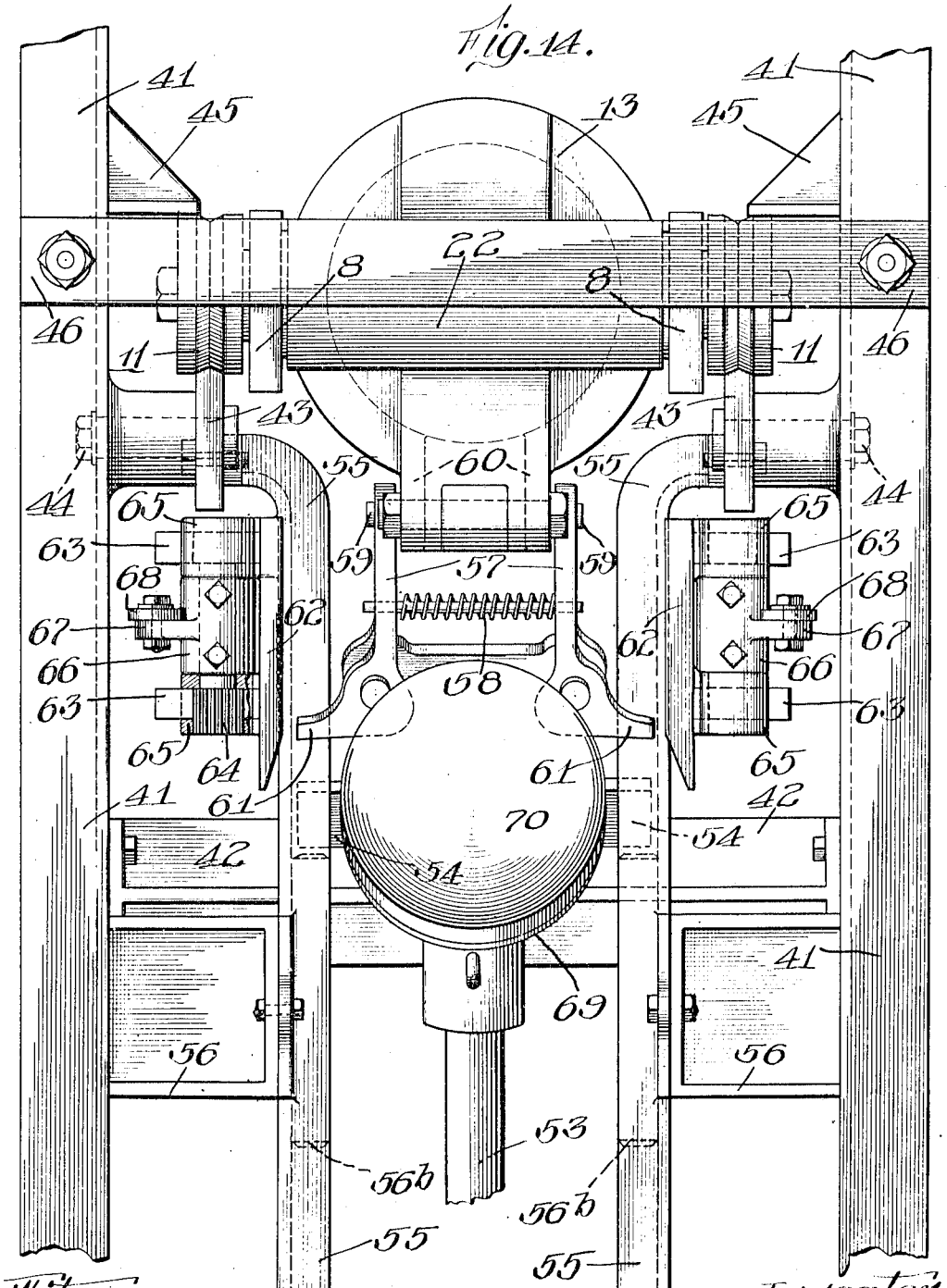

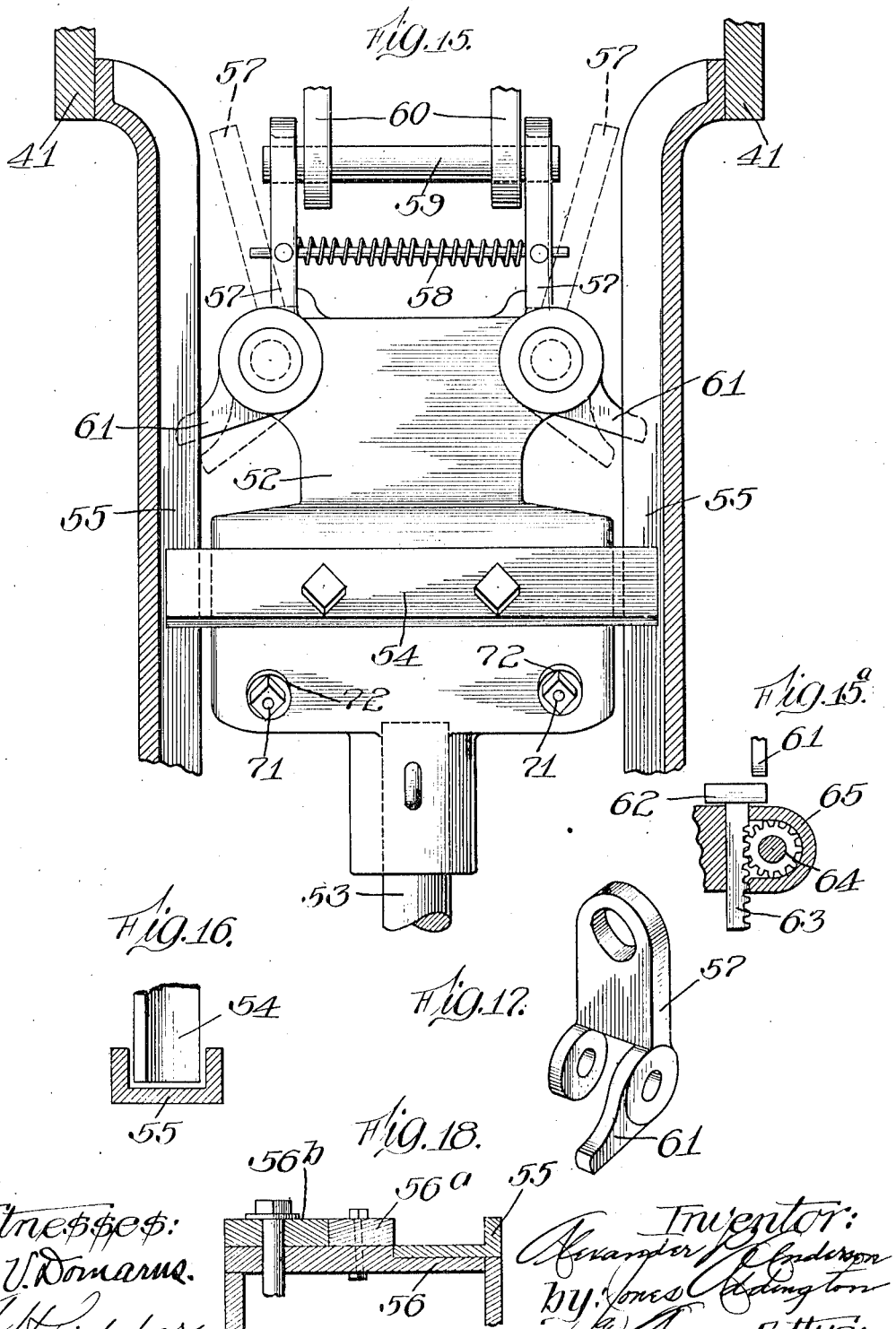

A. P. ANDERSON.
APPARATUS FOR PUFFING STARCH CONTAINING MATERIAL.
APPLICATION FILED AUG. 3, 1906.
1,035,840.
Patented Aug. 20, 1912.
9 SHEETS—SHEET 7.
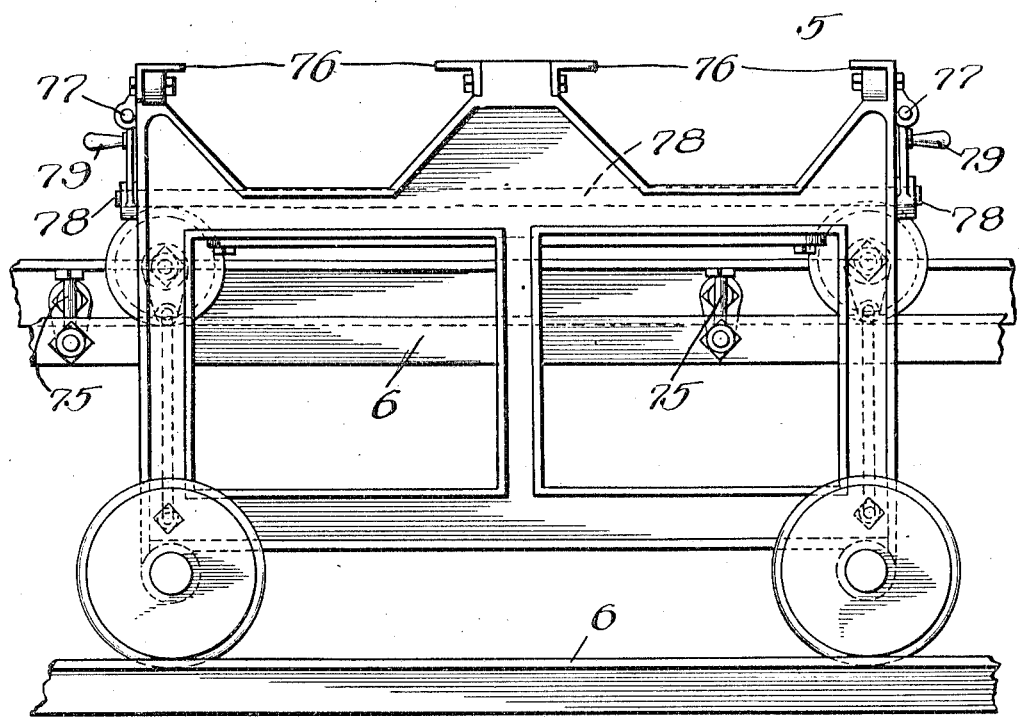
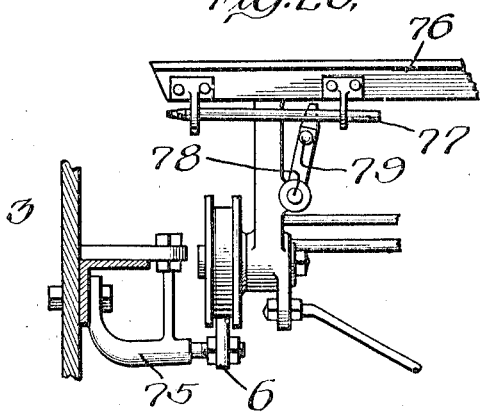
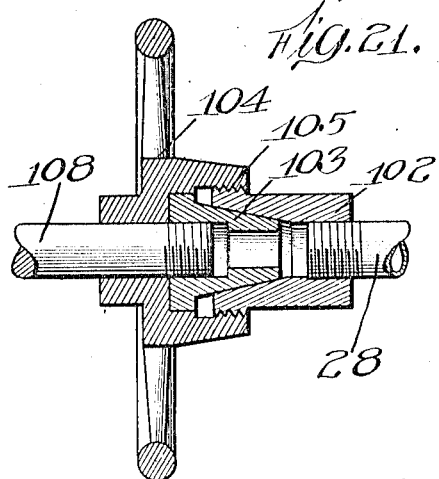

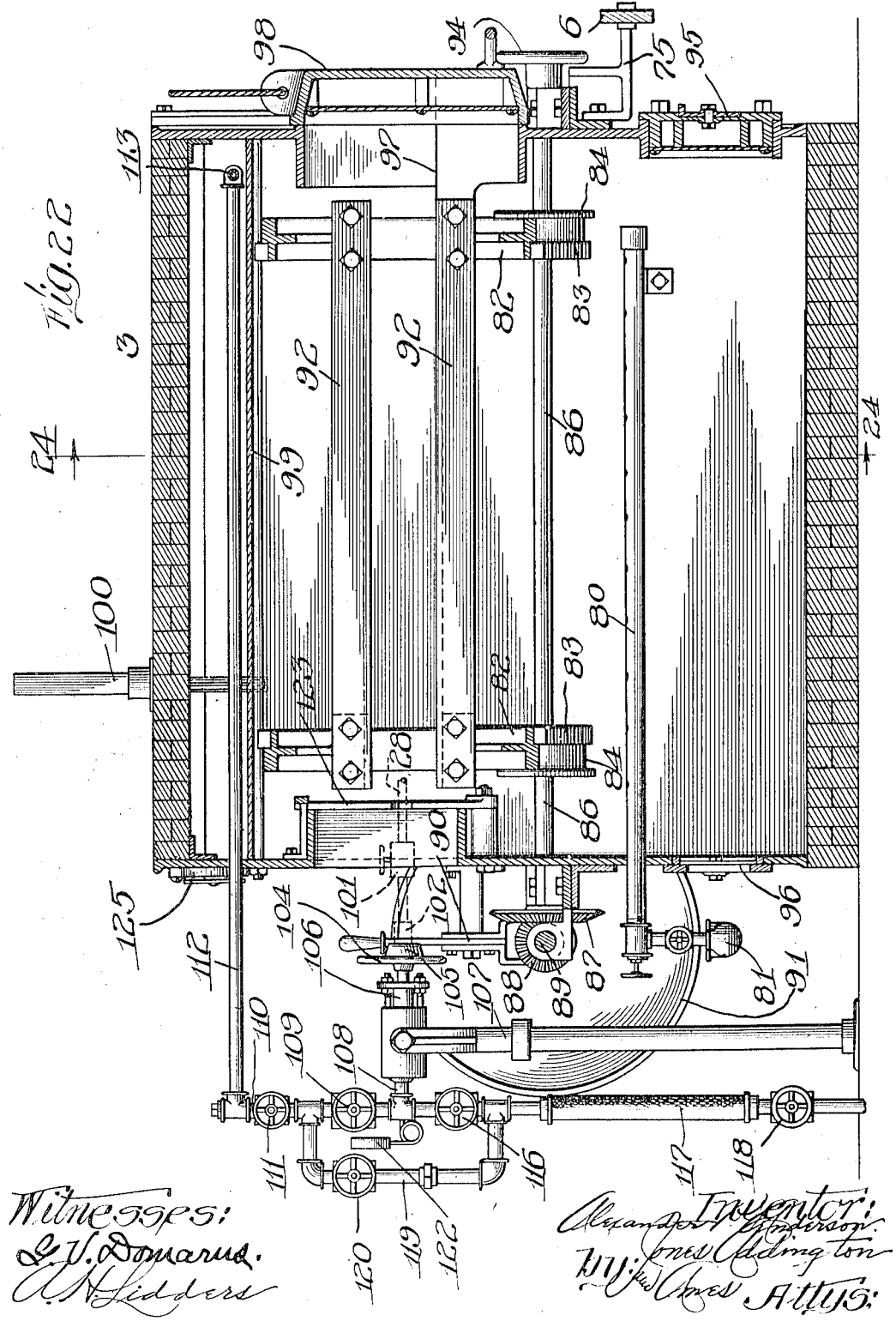

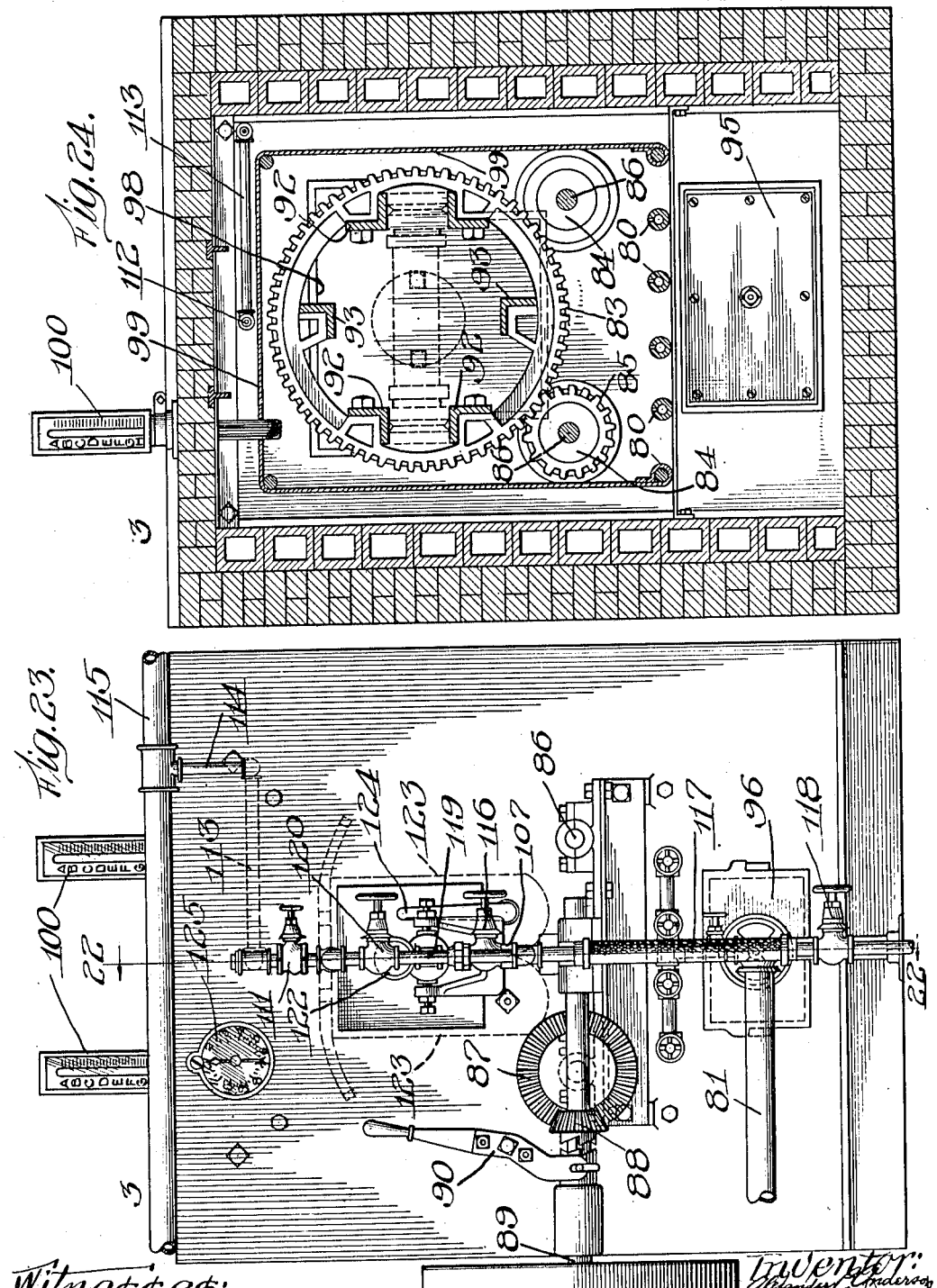

UNITED STATES PATENT OFFICE.

ALEXANDER P. ANDERSON, OF CHICAGO, ILLINOIS.

APPARATUS FOR PUFFING STARCH-CONTAINING MATERIAL.

1,035,840.  Specification of Letters Patent.  Patented Aug. 20, 1912.

Application filed August 3, 1906. Serial No. 329,030.

*To all whom it may concern:*

Be it known that I, ALEXANDER P. ANDERSON, a citizen of the United States, residing at Chicago, in the county of Cook and State of Illinois, have invented new and useful Improvements in Apparatus for Puffing Starch-Containing Materials, of which the following is a full, clear, concise, and exact description, reference being had to the accompanying drawing, forming a part of this specification.

My invention relates to improvements in apparatus for treating cereal-grains, starch, starch-containing materials and the like, to make suitable food and other products. One important commercial use of the said apparatus is in the making of the cereal food product known as "puffed rice", although, as will be evident, it can be used in connection with the treatment of other materials and for making other products.

In the making of "puffed rice", the raw rice is put into a receptacle which is sealed and subjected to heat, and after having been heated for a time, the receptacle is suddenly opened, thereby permitting the rice to escape therefrom and puff up in size, thus forming the "puffed rice" of commerce.

One object of my present invention is to provide apparatus for carrying out this and kindred processes in an expeditious, economical and practical manner. Other objects are to provide apparatus for conveniently and accurately carrying out the desired processes on a comparatively large scale, and at the same time rendering the operation so simple as to require only ordinarily skilled labor to attend the same.

Other objects will appear from the detailed description and claims.

In carrying out the invention in the accomplishment of these objects, and in the preferred way, I provide a receptacle, preferably in the form of a cylinder or drum, into which is introduced the material to be treated. This drum, as it may be termed, after having been closed by a lid or cover is sealed, and then placed in an oven, suitably equipped for the purpose, and heated to the desired temperature, and at the same time rotated to agitate or tumble the material about. After this treatment, the drum is moved from the oven and discharged of its contents by the sudden release of the lid.

The drum is mounted upon a suitable car capable of being rolled or moved about and is thus readily brought to the various parts of the apparatus for handling. After the drum has received its charge of material, and the lid has been closed and sealed by proper manipulation, as herein later set forth, it is conveyed by a suitable transfer mechanism to the oven for heating, while being rotated. It is then taken to a suitable mechanism, and there operated to allow the lid to quickly open and the contents of the drum to discharge into a cage adapted to receive and confine it, suitable conveyers being provided to carry the completed product from this cage to the storage or other place.

Referring to the accompanying drawings, illustrating one form of apparatus, embodying my improvements, in which the same reference characters designate like parts throughout the several views: Figure 1 is a plan view of the system of apparatus embodying my improvements; Fig. 1ª is a detail view of the driving mechanism placed beneath the floor to operate the drum-raising and lowering mechanism; Fig. 2 is a view showing in elevation the apparatus of the complete system; Fig. 3 is a longitudinal sectional view taken through the center of the drum; Fig. 4 is a rear end view of the drum; Fig. 5 is a front end view of the same; Fig. 6 is a transverse sectional detail view taken on the line 6—6 of Fig. 3; Fig. 7 is a similar view taken on line 7—7 of Fig. 3; Fig. 8 is a plan view, partly in section, of the drum and its supporting car or frame; Fig. 9 is a detail view of the locking mechanism for the drum; Fig. 10 is a detail sectional view taken on line 10—10 of Fig. 8; Fig. 11 is a cross sectional view of the clamping roller at the forward end of the drum car or truck, said view being taken on line 11—11 of Fig. 8; Fig. 12 is a side elevation taken on the line 12—12 of Fig. 13, of the mechanism for holding the drum and its car during the charging and discharging operations; Fig. 13 is a rear end elevation of such mechanism; Fig. 14 is a front elevation of the same; Fig. 15 is a detail view of the raising and lowering mechanism for the drum, showing the vertically movable cross head and associated parts; Fig. 15ª is a detail view of the supporting means for the cam plates 62; Fig. 16 is a detail view of the guide or way by which the cross head is guided in its vertical movement; Fig. 17 is a detail perspective view of one of the links which connects the cross head with the drum; Fig. 18 is a detail sectional view showing that portion of the cross head guide-way adjacent the position of the cross head at the time the drum is discharged; Fig. 19 is a side elevation of the transfer carriage for the drum; Fig. 20 is a detail view showing the means for locking the said carriage in position at one of the ovens; Fig. 21 is a sectional view of the coupling between the pipe connected with the drum and the system of piping associated with the ovens; Fig. 22 is a longitudinal sectional elevation of one of the ovens; Fig. 23 is a rear end elevation of one of the ovens, and Fig. 24 is a cross sectional view of the oven taken on the line 24—24 of Fig. 22.

Figs. 1 and 2 illustrate more or less diagrammatically the apparatus comprised in the complete system herein specifically described,—that is, the car-holding mechanisms are indicated as a whole by 2; a series of ovens is shown at 3, and the cage at 4; suitable transfer mechanism consisting of the carriage 5, running upon the track 6, 6, is located between the ovens and the car-holding mechanisms to enable the drums (of which there is usually a plurality,) to be transferred from said mechanisms to the ovens, and from the ovens back to the mechanisms. In order that these various parts may be fully understood, I shall refer first to the other figures of the drawings and then return to these figures in connection with the description of the complete operation.

The drum, indicated more clearly in Figs. 3 to 8, consists of a metallic cylinder 7, preferably of cast bronze or other material having a higher coefficient of expansion than steel or iron for the purpose hereinafter explained, and is of any desired size, the particular one indicated in the drawings being about nine inches in diameter by five feet in length. The interior of the drum is preferably smooth, so that the material will not readily adhere thereto and that it may be conveniently cleaned and kept in good condition.

As indicated in Fig. 8, the drum is mounted upon a car consisting of the two side members 8, 8, of bar iron or steel having a trunnion 9 (see also Fig. 10), extending between said members at the rear end, and a shaft or axle 10, between their forward ends, rollers or small wheels 11 being mounted outside of the members 8 upon the projecting ends of the trunnion 9 and shaft 10. These parts are all fitted and secured together to make a rigid frame or car for the drum.

The drum is secured at its rear end to the inner face of the trunnion 9 by means of the tap bolts 12 the trunnion thus acting as a pivot for the drum and permitting its forward end to be raised and lowered as hereinafter described. The exterior of this rear end is of the form shown in Fig. 4. The forward end of the drum is provided with a lid 13 (see also Fig. 5) hinged by lugs 14 to the lug 15 projecting from the adjacent portion of the front end of the drum, the lugs 14 having slots somewhat longer than the diameter of the pivot pin 16 (as shown in Fig. 3,) to provide sufficient clearance to enable the lid to be accurately closed. The outer part of the lid 13 consists of a casting cored out, as indicated in Figs. 3 and 5, to lighten it as much as possible, and to its inner face is secured by suitable screws 17, a clamping plate or disk 18, which serves to clamp in position a lead gasket 19, which when the lid is closed serves to seal the forward end of the drum. In order that this sealing may be more perfect, the end of the drum is provided with a plurality of small corrugations or grooves 20 which sink into the face of the gasket when the lid is closed. The central projection of the plate 18, together with the peripheral lip 21 of the lid 13, serves to confine the lead gasket in its seat; but any wear of the same or crowding out due to repeated closings is allowed for by the slots in lugs 14 whereby the lid tightly closes all around, whatever the condition of the gasket.

The structure of the lid *per se* is not claimed in this case for the reason that it forms the subject-matter of a divisional application Serial No. 405,820, filed December 9, 1907.

In order that the lid may be closed and the drum sealed air-tight, a roller 22 is mounted upon the shaft 10 at the forward end of the frame, anti-friction rollers 23 being placed between the roller 22 and the shaft 10, the position of this roller 10 being such that when the drum is in position between the side members 8, that is, horizontal or parallel with them, the lid is tightly closed and the drum sealed with an air-tight connection. It will be noted that this portion of the lid against which the roller 22 bears is curved so that when the forward end of the drum is raised and the lid is closed, and the said end is then again lowered, the roller rides up over this curved surface, thereby tightly closing and clamping the lid in place when the drum is down between the side members; also, that when the end of the drum is lowered, the roller passes off the curved surface at its opposite edge. In order that this closing and sealing may be accomplished the distance between the trunnion and roller must be accurately spaced with reference to the length of the drum, and adjustment to take up wear and to allow for any crowding out or compression of the gasket is made by placing shims or thin wedges between the trunnion 9 and the rear end of the drum. As shown in the drawings, the radius of the curve of the outer side or surface of the cover is less than the radius of the arc traversed by that portion of the cover, whereby the pressure of the roller on the cover is greatest at the center,—this being the preferred arrangement.

In order that steam may be admitted to the interior of the drum or that the vapors in the drum may be withdrawn therefrom while the lid is closed, I provide along one side in the interior of the drum, a flattened pipe 24 secured at the forward end by a suitable screw bolt 25 and at the rear by projecting into an aperture in the rear end of the drum, a screw plug 25′ being inserted into this aperture to secure the pipe in place therein, and at the same time permitting it to be opened for cleaning or other purposes. Along the two edges of the pipe 24 are located at intervals the apertures 26 preferably drilled so that any injected steam will first strike the hot inner face of the drum and thereby become more or less superheated. These apertures are placed closer together toward the forward end of the drum as indicated in Fig. 3, to more evenly distribute the steam injected. A cored out passage 27 in the rear end of the drum connects with the pipe 24. Centrally arranged at the rear end of the drum is a tube 28 extending through the trunnion 9 and adapted to be connected with the system of piping associated with the ovens, whenever the drum is placed therein.

In order to lock the drum in position with the lid closed and sealed, the locking means indicated in Figs. 8 and 9 is provided, this means consisting of a cam plate 29, pivoted to one of the side members 8 upon the stud 30. A stud or pin 31 extends through a horizontal slot in the member 8, and through the angular cam slot 32 in the cam plate 29. The inner end of this pin 31 is adapted in its forward position to project between the lugs 33 upon the forward end of the drum, said lugs being shown in Figs. 5 and 8, and in its rearward position to be free from those lugs. Owing to the angular position of the cam slot 32, when the plate 29 is raised, the said pin 31 is drawn toward the rear of the car, thus withdrawing its inner end from between the lugs 33; and whenever the cam plate is in the position shown, it is in its forward position between the lugs 33, and therefore holds the drum between the side members substantially parallel therewith. As the only time that it is necessary to unlock the drum is when it is either being charged or discharged, a suitable lever 34 is pivoted to the frame of the car-holding (hereinafter described at length) mechanism which lever, when its upper end is raised, lifts said cam plate 29 to unlock the drum.

This arm or lever 34 is operated by connecting rods, 35, which at one end is attached to the lower arm of the lever 34, and at its opposite end to hand lever 36, pivoted to the rear end of the frame of the car-holding frame-work or mechanism.

Suitable safety lugs or pins 40 are provided on the side members 8 of the car, to sustain the same in case the rollers should accidentally run off the ends of the various tracks provided therefor.

In order to hold the car upon which the drum is mounted in position during the charging and discharging operations, I provide what I term a car-holding mechanism, comprising a suitable metallic frame-work (Figs. 12 to 18) into which the drum is run to be in position to be charged or discharged. Although in the drawings I have for the sake of simplicity and clearness shown such a frame-work as designed to hold the car both during the charging and the discharging operations (as indicated in Fig. 2 in full lines and dotted lines, respectively), yet it is apparent, and I desire to have it so understood, that one such frame-work might be used to support the drum and its car only during the charging operation, while another and separate such frame-work, conveniently located, might be used to support the drum and its car only during the discharging operation. Of course, each frame-work has associated therewith, mechanism for temporary connection with the drum, to raise or lower the same in order to bring it to charging or discharging positions respectively; that is to say, to positions in which the drum is charged or discharged. Also this raising and lowering mechanism moves the drum to a position in alinement with the car (as shown in Fig. 12) for sealing the drum.

Taking up now the detailed description of the frame-work, one suitable embodiment of which is set forth in Figs. 12 to 18, it will be observed that the side members 41 (which might preferably be of cast iron) are provided with cross members 42 bolted thereto; suitable wood or sheet iron paneling being provided to entirely inclose the same except the forward end which faces the discharge cage 4. Suitable track rails 43 are bolted as at 44 upon lugs projecting from these side members 41 (as indicated in Figs. 12, 13 and 14) upon which rails the rollers 11 of the car are adapted to run when the latter is moved into said mechanism, as shown in these figures. Projecting lugs 45 stand over the rollers 11 of the car when the latter is in the charging and discharging position to hold the same firmly to the track. Also, with the car in position in said mechanism, the forward ends of the side bars 8 of the car abut the cross bar 46. Hooks 47, pivoted at their forward ends upon bolts 48 projecting from the inner faces of track rails 43, engage the car when raised by cams 49, carried by rock shaft 50, to firmly hold the said car in position in the said mechanism, particularly at the time of discharging. This rock shaft is operated by hand lever 51 at the side of said mechanism.

As the drum in itself is of considerable weight, and also as the roller 22 is so placed as to require considerable force to bring the drum into central position, suitable mechanism is provided to raise and lower this end of the drum. For this purpose a cross head 52 (see Fig. 15) is raised and lowered by a screw 53 extending below the floor of the room in which this apparatus is located, and is there driven by suitable power mechanism (see Fig. 1ª), so as to rotate the same in either direction and at controllable speeds, such driving mechanism being controlled by any means such as a hand lever 53$^f$ within the reach of an attendant at the side of the charging machine. This cross head 52 has a guide bar 54 bolted thereto, the ends of which throughout the lower part of their movement travel in arc-shaped ways 55 having as centers the trunnion 9 of the drum frame; these ways are bolted at their upper outwardly curved ends to the inner faces of the track rails 43, and at their lower ends to rectangular supports 56 cast upon and projecting inwardly from the sides 41 of the framework. To the upper corners of this cross head 52 are pivoted two links 57, shown in detail in Fig. 17, drawn toward each other by a coil spring 58 extending therebetween. The upper ends of these links are apertured to fit over the ends of a pin 59 carried by lugs 60 cast upon the lower side of the drum 7 near its front end, as shown also in Fig. 7. When these links are connected with the pin as shown in Figs. 14 and 15, the drum is thereby connected with the cross head and its forward end may be raised and lowered (as desired) either for charging or discharging. These links 57 are adapted to be swung outwardly, as shown in dotted lines in Fig. 15, to free them from the pin 59 and thus to disconnect the drum,—it being desired to do this only when the drum is in its closed or horizontal position. For this purpose, the links are provided at their lower ends with outward projecting lugs 61 which, when the cross head is at the intermediate position, are adapted to be engaged by the vertical cams 62 in line therewith, carried by the horizontal racks 63 at the upper and lower ends thereof (see also Fig. 15ª). The teeth of the racks are enmeshed with small pinions 64 within the supports 65 projecting from the outer sides of the ways 55. These pinions are connected by a vertical shaft, to which are intermediately bolted the sleeves 66, having outwardly extending arms 67 connected by connecting rods 68 (Fig. 12) with similar arms upon the rock shaft 50, and therefore operated by hand lever 51. When the hand lever 51 is moved forwardly to release the hooks 47 at the rear of the frame, the cam plates 62 are moved inwardly and engage the projections 6 on the lower ends of the links 57, thereby spreading their upper ends apart and disconnecting them from pin 59. The reverse movement of the hand lever withdraws the cams 62 and permits the links to engage the said pin. When the cross head is raised sufficiently, it passes above the ways 55, but owing to the fact that it is then connected by the links 57 with the drum, no harm results, and upon descending the guide 54 again passes down into the ways 55.

As shown in Fig. 1ª, Sheet 1, the screw 53 has an internally threaded beveled gear 53ª threaded thereon, and supported in the frame 53$^b$ the screw 53 being splined and passing through a keyed socket 53$^c$ in the opposite side of the frame 53$^b$, the key projecting into the spline or slot of the screws to prevent same turning. The frame 53$^b$ is journaled at 53$^d$, to accommodate the different angles of the screw. A bevel gear 53$^e$ drives said nut 53ª and may be operated in either direction and at the desired speeds by any suitable and well known mechanism, and preferably under control of hand lever 53$^f$.

When the drum is lowered for discharging it is evident that the lid will be thrown open with considerable force if a high pressure is present within, as is the case in the manufacture of "puffed rice." For the purpose of absorbing the shock when the lid is thrown open and preventing injury to the apparatus, a disk of metal 69 is faced with a circular block of wood 70, rubber or the like, placed in position to be struck by the lid when the same is thrown open. At the back this metallic disk is pivoted to two bolts or pins 71 passing through suitably formed bosses 72 in the cross head casting, heavy coiled springs 73 being placed on said pins between the said bosses and shoulders on the forward ends of the pins, other springs 74 holding the said disk and wooden block at the desired angle. When now, the said lid is blown open the wooden disk and coiled springs take up the shock and prevent injury or breakage of the parts.

To assist in taking the shock of the explosion and of the opening of the lid, the rear flange of the guide 55 is cut at about the place where the ends of the bar 54 of the cross head stand at the time of the discharge and as seen in Figs. 12 and 18, an intermediate block of metal 56ª backed up by a wooden wedge 56$^b$ is suitably bolted in place, thereby taking the shock at the ends of the bar 54 and preventing breaking of the flange of the guide.

A further explanation of the operation of this portion of the apparatus in connection with the operation of the whole apparatus, will be made later.

The transfer carriage and tracks are more clearly shown in Figs. 2, 19 and 20, the carriage 5 being adapted to travel back and forth between the car holding mechanisms and the ovens, and is designed to receive one or two drums and their cars from any of the said mechanisms or ovens. The rail 6 adjacent the car-holding devices is secured to the floor, in any desired manner, while the opposite rail 6 is secured higher up to the front of the ovens by suitable brackets 75 bolted or cast in position upon the oven fronts. The carriage itself is provided with suitable wheels to run on these rails and includes an open metallic frame work, (preferably of cast iron, and, as indicated, strongly braced in all directions,) carrying the two pairs of rails 76, 76, bolted to the upper side of the said frame, and adapted to receive the rollers of the cars when it is desired to move the drums from one point to another. While the particular carriage herein shown is made to accommodate two drums, it will be evident that a carriage to accommodate a less or greater number of drums may be provided for, and that more than one carriage may be used.

When the carriage is in position before one of the oven doors, it may be secured in said position by the slidable pins 77, one on either side of the carriage near the upper edge. These pins are adapted to be slid back and forth by arms 77' which are secured at their lower ends to a shaft 78 carried by the frame of the carriage, and which have their upper ends inserted in slots in the said pins. Handles 79 serve to operate said arms and pins. The ends of these pins 77 are tapered and are adapted when thrust forward, to enter corresponding holes in the adjacent parts of the ovens. By this means the car can be locked in the proper position to receive or deliver the drum. By this arrangement, the drums may be conveniently transferred from the oven to the car-holding mechanisms, and vice versa, or to storage tracks.

The oven and associated parts are shown more in detail in Figs. 21 to 24. Of course, it is to be understood that any suitable number of such ovens may be employed. These ovens may be of any suitable construction, so far as the exterior walls are concerned, the ordinary brick and tile construction being satisfactory. The particular oven shown is heated by gas from the burners 80 extending longitudinally through the lower part of the oven, and connecting at their outer ends through suitable valves and connections with the gas supply mains 81. Above the burners is located a rotating cage in which the car carrying the drum is adapted to be placed from the front end of the oven. This cage includes the two cage-rings 82, 82, one at either end, having gears 83 formed on a portion thereof, which rings are supported by pairs of rollers 84 at each end of the oven, the rollers at the left as seen in Fig. 24 being provided with pinions 85 adapted to mesh with the gears 83 of the cage-rings. These rollers 84 are mounted upon shafts 86 journaled in suitable bearings at each end of the oven, the shaft at the left being provided with a beveled gear 87 outside of the oven. This gear in turn meshes with a beveled pinion 88 loosely mounted upon a power driven shaft 89, extending along the rear of the oven and adapted to be revolubly connected therewith by means of a clutch and lever 90. By this means, when power is applied to shaft 89 (as for instance through the medium of the pulley 91,) the cage-rings are rotated. These cage-rings are provided with suitable shoulders to which are bolted angle iron track rails 92 between which the rollers 11 of the drum car are adapted to travel when the car is in the cage. Similar bracing bars 93 above and below the track rails are also bolted to the cage rings to further strengthen and stiffen the rotatable cage. In order that this cage may have its track rails suitably alined with the corresponding track shoulders cast in the oven fronts and therefore with the tracks upon the carriage, hand wheels 94 are secured to the front ends of the shafts 86 to which the pinions are secured, thus permitting the cage to be rotated by hand to adjust its position.

The cast iron ends of the oven are provided with suitable ventilating openings 95 and 96 in the front and rear respectively, dampers being provided to enable the openings to be closed more or less or entirely opened. At the front end of the oven, a suitable opening, indicated in outline in Fig. 24, is formed to permit the drum and its car to be placed within the rotating cage, shoulders or offsets 97 being formed in this opening to provide continuations of the track for the drum car. A door 98 sliding in suitable guides and preferably counterbalanced by means of a rope and weight (see Fig. 2), is adapted to be raised and lowered to open and close this front aperture. A crown sheet 99 may extend around the two sides and over the top of this cage-ring, to confine the heat and concentrate it upon the drum. Thermometers 10⁰ are provided at suitable points upon the furnace to register the temperature therein.

The pipe 28 projecting from the rear end of the drum is provided with a valve 101, preferably asbestos packed, and terminates in a female member 102 of a ground joint connection, more clearly shown in Fig. 21.

The male member 103 is placed at the rear of the oven and connected with the stationary system of piping. When, therefore, the drum-car is run into the cage, this male member 103 enters the female member 102, forming therewith a steam and air-tight joint, and the two are then secured together by means of the hand wheel 104 having a threaded connection 105 with said female member 102. Toward the rear of this hand wheel 104 is a stuffing box 106 (see Fig. 22) of the usual or desired construction which permits rotation between the drum and the stationary or fixed parts of the system of piping. A suitable standard 107 supports the stuffing box 106 and the connections associated therewith. This system of pipes and valves is for the purpose of injecting steam into the drum even during the time that the same is being rotated and also for the purpose of permitting the escape from the drum of steam or vapors. The pipe 108, which is connected with the stuffing box 106, is connected through a valve 109 with the steam pipe 110, a suitable valve 111 being placed in the steam pipe. The latter is connected by intermediate pipes 112, 113 and 114 with the steam supply main 115. The portions 112 and 113 of this steam pipe are carried through the upper part of the oven to enable the steam to be superheated to a certain extent. In order that vapors may be drawn off from the drum, the pipe 108 is also connected through a valve 116, pipe 117, and the additional valve 118, with the drain or sewer connected with the building. A by-pass 119 around the valves 109 and 116 and containing a valve 120 is provided, this by-pass permitting the condensed water and cooler steam to be drawn off from the pipes before the superheated steam is injected into the revoluble drum. A pressure gage 122 is connected with the pipe 108 whereby the pressure within the drum may be readily observed at any time. By this system of valves and pipe connections, it is possible to withdraw from the revoluble drum any vapors or steam, to blow off the condensed steam in the piping, as well as the cooler steam, and to inject live or superheated steam into the drum in any desired quantity and up to any desired pressure. Thus, closing valves 109 and 120 and opening the valve 116, permits the steam or vapor within the drum to escape to the drain; closing valves 109 and 116 and opening valve 120, permits the water and cooler steam to be drawn off through the pipes; and by closing the valves 116 and 120, and opening valve 109, live steam is injected into the tube. Valves 111 and 118 are merely auxiliary. As before mentioned, the apertures in the tube 24 are so located as to permit an even distribution of the steam within the drum. The valve 101 serves to close the pipe 28 leading from the drum when the drum is to be disconnected from the system of piping at the hand wheel 104, and it is not desired that the pressure within the drum escape.

In order that the oven may be closed during the heating of the drum, small doors 123 are pivoted at their lower ends and are adapted to be opened outwardly or brought together to close around the pipe 28, semicircular notches being provided in the meeting edges of these doors to permit them to fit around the pipe 28. These doors for convenient manipulation may have their lower ends curved and provided with intermeshing gear teeth, and one of the pivot studs may have a handle 124 affixed to its outer end, thereby enabling such doors to be closed from the exterior of the oven by the movement of said handle or lever 124.

In order to determine the length of time to which the drum is subjected to the heat or treatment in the oven, a clock dial 125 is conveniently located at the rear end of the oven, having a hand or pointer which is adapted to be set at any particular place upon the dial, the attendant understanding that when the hour thus marked upon the dial approaches, the drum needs attention.

The apparatus thus described may be utilized for various purposes in addition to that of puffing cereal grains, such as rice. For example the apparatus may be employed for carrying out the process forming the subject of my application for patent Serial No. 332,804, filed August 31, 1906.

In the puffing of rice or other materials, the complete manipulation of the apparatus is as follows: Starting with the drum and its car within the car-holding machine, the raising and lowering mechanism is suitably operated by the operator or attendant by means of lever 53', to tilt the drum up into a position similar to that indicated in full lines in Fig. 2, to receive the charge of rice. This charging is accomplished by means of some suitable charging arrangement, comprising (in the instance shown) a hinged pipe 130 leading from below the charging pipe 131 which contains suitable valves operated by a hand lever 132, whereby, when said lever 132 is operated, the desired quantity of rice is measured and emptied into the drum. This pipe 131 may connect with a bin or other source of supply. The raising and lowering mechanism is then reversed by the attendant, who at the same time either closes the lid or swings it forwardly, so that as the end of the drum descends between the side members of the car, the roller 22 closes and clamps said lid in place, the corrugations or grooves 20 at the forward end of the drum engaging with the gasket and thereby making a sealed joint. The drum is then locked in this position by the lock shown in Figs. 8 and 9 by suitably operating the hand lever 36 to cause the pin 31 to engage between the lugs 33 at this end of the drum. The operator then moves the hand lever 51 at the rear end of the car holding machine into its forward position, thereby permitting the hooks 47 to disengage from the rear end of the car, and also moving the cam plates 62 toward each other and into engagement with the lower ends 61 of the pivoted links 57, thus causing said links to separate at their upper ends and disconnect from the drum. The carriage 5 is then brought into position at the rear of the car-holding machine and the car, carrying the drum, rolled upon the machine. The carriage is then moved to the desired oven, and the pins 77 caused to engage the holes in the front of the oven into which it is desired to place the drum. When the front door 98 of the oven is opened, if the rails of the cage ring are not in alinement with the shoulders 97, the hand wheel 94 may be operated to properly adjust them. The car is then pushed into the oven, the rollers 11 being confined in the ways or channels formed between each pair of the said rails 92. The front door of the oven is closed and the connection at the rear completed between pipe 28 and the stationary pipe system at the rear of the oven, by means of the hand wheel 104. The doors 123 at the rear of the oven are closed and the valve 101 opened. The material within the drum is now ready for whatever treatment is desired. As hereinbefore explained, by operating the clutch lever 90, the cage in the oven may be rotated, thus rotating the drum and tumbling the material about within the same; also the vapors may be withdrawn or steam injected by the operation of the proper valves, the temperature and pressure being ascertained at all times by thermometers 100 and gage 122. Different materials and different qualities of materials require different treatment, but whatever may be desired within the possibilities of the mechanism is readily accomplished by the proper operation of the said valves, etc.

At the end of the treatment in the oven, whatever such treatment may be, the valve 101 is closed, if pressure is to be maintained in the drum, the coupling 104 disengaged and the drum on its car again wheeled upon the carriage 5. It is then brought before the car-holding machine, and pushed into the same, in the same position that it occupied during the charging operation after the raising and lowering mechanism had been disconnected. As soon as the car has been pushed into position, the attendant swings the lever 51 toward the rear, thus raising the hooks 47 into engagement with the car and thereby clamping it in position. Also the cam plates 62 are withdrawn to their outer positions, thereby permitting the pivoted links 57 to be drawn together by the spring 58 to engage the ends of the pin 59 of the drum. This connects the raising and lowering mechanism with the drum and the attendant starts the same in a direction to pull the forward end of the drum down below the side members of the car, thereby freeing the lid from the roller 22. This is accomplished suddenly, and due to the pressure within the cylinder the lid flies open, thereby permitting the material to discharge from the forward end of the drum into the cage 4. In the case of rice, the sudden reduction of pressure at this time results in puffing or swelling the grains to many times their original size. The dropping of the forward end of the drum as shown in dotted lines in Fig. 2 permits gravity to assist in discharging the contents thereof. As before explained, the lid strikes against the buffer 70, thereby preventing injury to the same or to the raising and lowering mechanism. This mechanism, under the control of the attendant, may now be reversed and the gun lifted into the position shown in full lines in Fig. 2 to receive another charge and for repeating the operation.

The cage into which the drum discharges is preferably surrounded by a wire netting to confine the product when the explosion occurs, and the bottom thereof may be provided with hoppers of any desired make, leading to a suitable conveyer or conveyers 133 which in turn lead to the storage bins or to the place where the product is put up into packages for shipment, or reserved for still further treatment.

By making the drum of bronze while the side members are of iron I thus adjust the coefficients of expansion of the two so that the drum is not unsealed during heating, as would be the tendency in case the same material were used in both. This is due to the fact that the bars are heated to a higher temperature than the drum.

While I have thus described one commercial form of apparatus for carrying out the invention, and the specific mechanisms entering into the combinations as hereinafter claimed, it will be understood that various changes, substitutions and alterations may be made therein, without departing from the scope or principle of the invention.

Having thus described my invention, what I claim as new and desire to secure by Letters Patent, is:

1. In apparatus for puffing starch-containing materials, the combination with a support, of a drum for the material to be treated movably mounted on said support, a lid for said drum, and means on said support for closing the lid and holding the same closed when the drum is in a certain position, said means being arranged to permit sudden opening of the lid when the drum is moved to a certain other position.

2. In apparatus for puffing starch-containing materials, the combination with a support, of a drum for the material to be treated movably mounted on said support, a lid for said drum, means on said support for clamping the lid closed, means for sealing the lid when closed, and means for suddenly releasing the drum from the lid clamping means.

3. In apparatus for puffing starch-containing materials, the combination with a support, of a drum for the material to be treated movably mounted on said support, a lid for said drum, a lead gasket between the lid and drum, means on said support for clamping the lid closed upon said lead gasket to form a sealed joint, said means permitting the substantially instantaneous opening of said lid when the drum is moved to a certain position relative to the support, and means for moving said drum relatively to the support.

4. In apparatus for puffing starch-containing materials, the combination with a support, of a drum for the material to be treated movably mounted on said support, a lid for said drum, a soft-metal gasket carried by one of said parts and situated between the lid and the opposing surface of the drum forming a seat for the lid, said surface being roughened, said gasket and opposing roughened surface coöperating to form a sealed joint when the lid is closed, means on said support for holding the lid closed when the drum is in a certain position and arranged to permit sudden opening of the lid when the drum is moved to a certain other position, and means for moving said drum.

5. In apparatus for puffing starch-containing materials, the combination with a support, of a drum movably mounted thereon, a lid for said drum, a soft-metal gasket carried by the lid, and a roughened surface formed on the seat for the lid at the end of the drum, whereby, when the lid is closed and clamped in position, an air-tight joint is provided, means on said support for holding the lid closed when the drum is in a certain position and arranged to permit sudden opening of the lid when the drum is moved to a certain other position, and means for suddenly releasing the drum from the lid-locking means.

6. In apparatus for puffing starch-containing materials, the combination with a drum provided with a lid, of members at the side of the drum placed under tension when the lid is clamped in closed position, and means carried by said members for holding the lid closed, said drum being of a material having a greater coefficient of expansion than that of said members to prevent loosening or unsealing of the lid when the whole is subjected to heat.

7. In apparatus for puffing starch-containing materials, the combination with a metal drum provided with a lid, of side members of metal having a lower coefficient of expansion than that of the drum to prevent loosening of the lid when the whole is heated, and means carried by said members for holding the lid closed.

8. In apparatus for puffing starch-containing materials, the combination with a metal drum provided with a lid, of a car upon which said drum is mounted and held tightly closed, said car comprising side members of a metal having a coefficient of expansion having such a relation to that of the metal of the drum as to prevent loosening of the lid when the whole is heated, and means carried by said members for holding the lid closed.

9. In apparatus for puffing starch-containing materials, the combination with a metallic drum provided with a lid, of metallic clamping members for said lid, the metal of said members having a coefficient of expansion different from that of the metal of said drum, whereby loosening or unsealing of the lid, when the whole is heated, is prevented, and means carried by said members for holding the lid closed.

10. In apparatus for puffing starch-containing materials, the combination with a drum into which the material is introduced and which is subjected to heat during the treatment of the said material, of a lid at one end of the drum, clamping members for the lid extending alongside of the drum, and means carried by said members for holding the lid closed, said drum being of bronze and the clamping members of iron or steel, whereby, when the whole is heated, the lid remains tightly closed.

11. In apparatus for puffing starch-containing materials, the combination with a drum in which the material is placed for treatment, of a supporting frame therefor, a lid for one end of the drum, and means carried by said frame for closing and clamping said lid in closed position when the drum is brought into alinement with its supporting frame, and arranged to release the lid when the drum is moved out of such alinement.

12. In apparatus for puffing starch-containing materials, the combination with a drum in which the material is placed for treatment, of a frame upon which the drum is pivotally mounted, and means carried by said frame for holding said drum closed within the frame when the drum is in a horizontal position and arranged to release the drum when one end of said drum is raised or lowered.

13. In apparatus for puffing starch-containing materials, the combination with a drum, of a supporting frame with which said drum is pivotally connected, a lid for one end of the drum, and a cylindrical member journaled in the supporting frame to hold the lid in closed position when the drum is in line with the frame.

14. In apparatus for puffing starch-containing materials, the combination with a drum, of a supporting frame therefor, said drum being journaled at one end upon said frame whereby its opposite end may be raised or lowered from the frame, a lid for the free end of the drum, and a cylindrical member at the end of the frame adjacent the free end of the drum, said member engaging the lid when the drum is brought into line with the frame to clamp the lid in closed position.

15. In apparatus for puffing starch-containing materials, the combination with a drum, of a supporting frame with which said drum is pivotally connected to enable one end of the drum to be moved out of line with the frame, a lid for said end of the drum, means for clamping the lid closed when the drum is in line with the frame, and means for locking said drum in that position.

16. In apparatus for puffing starch-containing materials, the combination with a drum, of a supporting frame therefor mounted upon rollers or wheels to enable the same to be moved about, said drum being journaled to one end of the frame, a cylindrical member at the other end of the frame, and a lid for the free end of the drum having a curved outer surface which, when the lid is closed and brought into line with the frame, engages said member whereby the lid is tightly clamped in closed position.

17. In apparatus for puffing starch-containing materials, in combination, a drum, a support on which said drum is pivotally mounted, a lid for one end of the drum, and means carried by said support for holding the lid closed, said means exerting the greatest pressure against the lid when the drum is substantially in alinement with its support.

18. In apparatus for puffing starch-containing materials, the combination with a drum provided with a lid having a curved outer surface, of means for engaging said surface to clamp the lid in a closed position, said means exerting the greatest pressure against the lid when in engagement with said curved surface at the center thereof.

19. In apparatus for puffing starch-containing materials, in combination, a drum provided with a lid at one end thereof, a support upon which said drum is pivotally mounted, a roller journaled in said support for engagement with the lid to hold the same closed, said lid presenting a curved surface against which the roller bears, whereby the pressure of the roller against the lid is greatest when the roller engages said surface at the center thereof.

20. In apparatus for puffing starch-containing materials, in combination, a drum provided with a lid at one end, a support upon which said drum is pivotally mounted at its other end, a roller journaled in said support and arranged to exert pressure upon said lid and clamp the same closed when in engagement therewith, said roller being so arranged that its greatest pressure will be exerted on said lid when the drum is substantially in alinement with its support.

21. In apparatus for puffing starch-containing materials, in combination, a drum provided with a lid having a curved outer surface, a support upon which said drum is pivotally mounted, means on said support for engaging said surface to hold the lid closed, the radius of curvature of said surface being less than the distance between the center of said surface and the point of support about which the drum is pivoted, whereby the pressure of said closing means against the lid is greatest at the center of the lid.

22. In apparatus for puffing starch-containing materials, the combination of a drum having a closure, a car carrying said drum, means on said car for holding said closure sealed, a car-holding device, and means carried by said car-holding device for temporary engagement with said drum and arranged to move said drum out of engagement with said closure-holding means to unseal the same.

23. In apparatus for puffing starch-containing materials, the combination of a drum having a closure, a car carrying said drum, means on said car for maintaining said closure sealed while said drum is in a given position relative to the car, car-receiving mechanism, and means on said car-receiving mechanism for engagement with said drum and arranged to move said drum into and out of said position.

24. In apparatus for puffing starch-containing materials, the combination of a drum having a closure, a car carrying said drum, means on said car for maintaining said closure sealed while said drum is in a given position relative to the car, car-receiving mechanism, drum engaging means on said car-receiving mechanism whereby said drum may be moved to another position relative to the car so that the closure may open, said means being arranged also to move said drum to a third position, and mechanism arranged to charge said drum when said drum is in said third position.

25. In apparatus for puffing starch-containing materials, the combination of a drum having a closure, a car carrying said drum, means for closing and locking said closure when said drum is moved to a given position relative to the car, a car-receiving device having means for temporary engagement with said drum for moving said drum from closure-locking position to discharging position and from discharging position to charging position, and means for charging said drum.

26. In apparatus for puffing starch-containing materials, the combination of a drum, a car carrying said drum, a car-receiving device, a closure for said drum, charging mechanism for said drum, and means associated with said car-receiving device for unlocking said closure and moving said drum to discharging position and thereafter moving said drum to charging position.

27. In apparatus for puffing starch-containing materials, the combination with a movable drum in which the material is placed for treatment, of means for holding the drum closed, an oven for heating the drum, transfer mechanism to convey the drum from the oven to a discharging position, a device for receiving said drum and closing means, and mechanism on said receiving device for moving the drum out of engagement with said closing means to permit the discharge of the material from the drum.

28. In apparatus for puffing starch-containing materials, the combination with a drum in which the material is placed for puffing, of a support on which said drum is mounted, means on said support for holding the drum closed, mechanism temporarily associated with the drum to move the same out of engagement with said closing means to permit sudden opening of the drum, whereby the material is discharged therefrom and puffed, and a cage into which the drum discharges.

29. In apparatus for puffing starch-containing materials, the combination with a movable drum in which the material is placed for puffing, of an oven for the heating of the material in the drum, means for holding the drum closed, raising and lowering mechanism with which the drum is arranged to be temporarily connected, a transfer mechanism between the oven and said first-mentioned mechanism to convey the drum into a position where it may be so connected with said first-mentioned mechanism to move the drum out of engagement with said holding means, to permit sudden opening of the drum whereby the material is discharged therefrom and puffed, and a cage into which the drum discharges.

30. In apparatus for puffing starch-containing materials, the combination with a movable drum to receive the material for puffing, of charging mechanism for feeding into the drum the desired amount of the material, an oven, transfer mechanism for the drum between the oven and the charging mechanism, means for holding the drum closed, raising and lowering mechanism for moving said drum into and out of engagement with said closing means, either for sealing the drum or unsealing the same, and a cage suitably associated with the apparatus to receive the discharge of the drum.

31. In apparatus for puffing starch-containing materials, in combination, a drum, a car upon which said drum is movably mounted, mechanism for receiving said car, means to lock the car in position on said mechanism, raising and lowering mechanism to engage the drum for moving the same to charging or discharging positions, and means for simultaneously operating said locking means and said last-mentioned mechanism, either to simultaneously lock the car in position and bring said mechanism into engagement with the drum, or to simultaneously release the locking means and disengage said mechanism from the drum.

32. In apparatus for puffing starch-containing materials, in combination, a drum provided with a lid, a frame upon which said drum is pivotally mounted, means on said frame for holding the lid closed, mechanism for moving said drum out of engagement with said holding means to permit sudden opening of the lid, and resilient means carried by said mechanism for absorbing the shock due to sudden opening of the lid.

33. In apparatus for puffing starch-containing materials, in combination, a drum provided with a lid, a frame upon which said drum is pivotally mounted, means on said frame for holding the lid closed, mechanism for moving said drum out of engagement with said closing means to permit sudden opening of the lid, and a resiliently mounted disk carried by said mechanism for absorbing the shock due to such sudden opening of the lid.

34. In apparatus for puffing starch-containing materials, in combination, a drum provided with a lid, a frame upon which said drum is pivotally mounted, means on said frame for holding the lid closed, mechanism for moving said drum out of engagement with said closing means to permit sudden opening of the lid, resilient means carried by said mechanism for absorbing the shock due to sudden opening of the lid, and means for adjusting the angular position of said shock-absorbing means.

35. In apparatus for puffing starch-containing materials, in combination, a drum provided with a lid, a frame upon which said drum is pivotally mounted, means on said frame for holding the lid closed, mechanism for moving said drum out of engagement with said holding means to permit sudden opening of the lid, a resiliently mounted disk carried by said mechanism for absorbing the shock due to such sudden opening of the lid, and means for adjusting the angular position of said shock-absorbing disk.

36. In apparatus for puffing starch-containing materials, the combination of an oven, a drum, a car carrying said oven, means within said drum for receiving said car, means for revolving said car and said receiving means, a track exterior to said oven, and means for locking said car-receiving means in alinement with said track when said car is to be run into the oven.

37. In apparatus for puffing starch-containing materials, the combination of an oven, a car, a drum carried thereby, a rotatable support within the oven for holding said car, and means exterior to said oven for guiding said car upon said support when the car is run into the oven.

38. In apparatus for puffing starch-containing materials, in combination, a car, a drum mounted thereon, an oven, means for supporting said car and drum in said oven, and means for rotating said car and drum within the oven.

39. In apparatus for puffing starch-containing materials, in combination, a car provided with rollers, a drum mounted on said car, an oven, means in the oven to engage said rollers for supporting the car and drum, and means for rotating said car and drum and their supporting means within the oven.

40. In apparatus for puffing starch-containing materials, in combination, a drum mounted upon a car, an oven in which to heat said drum, a track within said oven for receiving the car, and means for rotating said track together with the car and drum while the latter is being heated.

41. In apparatus for puffing starch-containing materials, in combination, a car having rollers, a drum mounted on said car, an oven, supporting means therein forming oppositely located ways to receive said rollers for supporting the car and drum in the oven, and mechanism for rotating together said supporting means, car and drum within the oven.

42. In apparatus for puffing starch-containing materials, in combination, a sealed drum containing the material to be treated, an oven in which said drum is placed for heating, a rotatable support within the oven for said drum, means for rotating said support and drum in the oven during the heating, and means for admitting steam into said drum while being heated and rotated in the oven.

43. In apparatus for puffing starch-containing materials, in combination, a sealed drum containing the material to be treated, an oven in which said drum is placed for heating, a rotatable support within the oven for said drum, means for rotating said support and drum in the oven during the heating, and means for admitting steam into said drum while being heated and rotated in the oven, said means causing a distribution of the steam within the drum.

44. In apparatus for puffing starch-containing materials, in combination, a sealed drum containing the material to be treated, an oven in which said drum is placed for heating, a rotatable support within the oven for said drum, means for rotating said support and drum in the oven during the heating, and means supported in the drum for admitting steam into said drum while being heated and rotated in the oven.

45. In apparatus for puffing starch-containing materials, in combination, a sealed drum containing the material to be treated, an oven in which said drum is placed for heating, a rotatable support within the oven for said drum, means for rotating said support and drum in the oven during the heating, and means supported in the drum for admitting steam into said drum while being heated and rotated in the oven, said means causing a distribution of the steam within the drum.

46. In apparatus for puffing starch-containing materials, the combination of an oven, a drum, means within said oven for receiving said drum, means for revolving said drum-receiving means, a pipe within the drum having an inlet located in the axis of revolution of the drum and drum-receiving means, and means arranged in line with said pipe for supplying steam to said pipe when said drum is run into said oven upon said drum-receiving means.

47. In apparatus for puffing starch-containing materials, the combination of an oven, a drum, means within said oven for receiving said drum, means for revolving said drum-receiving means, a pipe within the drum having an inlet located in the axis of revolution of the drum and drum-receiving means, and swiveling means arranged in line with said inlet for supplying steam to said pipe when said drum is run into said oven upon said drum-receiving means.

48. In apparatus for puffing starch-containing materials, the combination of an oven, a drum having a steam inlet, a car carrying said drum, means in said oven for holding and revolving said drum, and swiveling steam supply means arranged for connection with said inlet when said car is run upon said car-holding means.

49. In apparatus for puffing starch-containing materials, in combination, a rotating drum, a flattened pipe secured to the inner wall thereof, said pipe having a plurality of suitably spaced apertures along the edges thereof, and means for admitting steam into said pipe through the axis of the drum, whereby the steam is injected into the interior of the drum and distributed within the same.

50. In apparatus for puffing starch-containing materials, in combination, a drum, a distributing steam pipe secured to the inner wall thereof and arranged to project the steam against the wall of the drum, said drum being in its rear end provided with an aperture into which said pipe projects, removable means in said end of the drum for closing said aperture to permit ready opening of the pipe, and means for admitting the steam through said removable means.

51. In apparatus for puffing starch-containing materials, in combination, a drum, a pipe secured to the inner wall thereof, said drum being in its rear end provided with an aperture into which said pipe projects, a removable screw or plug in said end of the drum for closing said aperture to permit ready opening of the pipe, and means for admitting steam to said pipe through said plug.

52. In apparatus for puffing starch-containing materials, in combination, a drum, an oven in which said drum is placed for heating, a stationary system of pipes associated with said oven, means for connecting said system with the interior of the drum to admit steam into the same, and means for rotating the drum while such connection is established, whereby steam may be admitted into the drum during its rotation.

53. In apparatus for puffing starch-containing materials, the combination with an oven having a stationary system of piping associated therewith, of a drum for the material to be treated, a rotatable support for the drum within the oven, means for rotating said support and drum, and means for connecting said system of piping with the interior of the drum while the same is heated and rotated in the oven, said system of piping including means for blowing off the vapors within the drum, for admitting steam to the drum, and for measuring the pressure within the drum.

54. In apparatus for puffing starch-containing materials, in combination, a drum, an oven for heating the same, a rotatable support for said drum within the oven, means for rotating said support and drum, a system of piping associated with the oven comprising a pipe connected with the drum, a steam-supply pipe, a drain-pipe connected to said first-mentioned pipe, and a valve in each of said drain and steam pipes, whereby the pressure within the drum may be exhausted or steam admitted thereto during the rotation of the drum.

55. In apparatus for puffing starch-containing materials, in combination, a drum, an oven for heating the same, means for movably supporting said drum within said oven, means for imparting movement to said drum, thereby to agitate the starch-containing materials therein, a connection from said drum leading to the exterior of the oven, a steam-pipe and a drain-pipe connected with said connection, a drain-pipe also connected with the steam-pipe, and a valve in each of said drain pipes and said steam pipe, whereby the pressure in the drum may be exhausted therefrom, the water of condensation and cool steam drawn off from the steam pipes, and live steam admitted to the drum.

56. In apparatus for puffing starch-containing materials, in combination, a drum, an oven in which said drum is placed for heating, a steam-carrying pipe associated with said oven, and means for connecting said pipe with the interior of the drum to admit steam thereinto.

57. In apparatus for puffing starch-containing materials, in combination, a drum, an oven in which said drum is placed, a steam super-heater, swiveling means for connecting said super-heater with the interior of the drum to admit super-heated steam into said drum, and means for rotating the drum within the oven while such connection is established.

58. In apparatus for puffing starch-containing materials, the combination with an oven, of a rotatably supported drum therein, a pipe leading into said drum and arranged to maintain connection therewith while said drum is being rotated, a steam super-heater connected with said pipe, and connections whereby the vapors under pressure in the drum may be blown off and super-heated steam admitted through said pipe.

59. In apparatus for puffing starch-containing materials, the combination with a drum, of a support therefor, means on said support for holding the drum closed, and mechanism for moving said drum out of engagement with said holding means to permit quick opening of the same.

60. In apparatus for puffing starch-containing materials, the combination with a movable drum, a car upon which said drum is mounted, means on said car for holding the drum closed, mechanism for moving said drum out of engagement with said holding means to permit sudden discharge of its contents, and means for holding the car fixed during such discharge.

61. In apparatus for puffing starch-containing materials, the combination with a car, of a drum mounted thereon and having one end journaled thereto, a lid for the opposite or free end of the drum, means for clamping said lid in closed position, mechanism into which the car is run, and raising and lowering mechanism to cause the free end of said drum to be lowered, to permit said end to be suddenly opened whereby the drum is quickly discharged of its contents.

62. In apparatus for puffing starch-containing materials, the combination with a car, of a drum mounted thereon to enable it to be moved about, one end of said drum being pivoted to said car and its opposite end free to be raised and lowered, mechanism into which said car is placed, and means to lift the free end of the drum into position to be charged with the material to be treated and to lower the drum from its normal position to permit the discharge of its contents.

63. In apparatus for puffing starch-containing materials, the combination with a car, of a drum mounted thereon and having a lid at one end, means for clamping the lid in closed position when the drum is substantially parallel with the frame of the car, mechanism into which said car is run and locked therein, means for raising the free end of said drum to permit it to be charged with the desired amount of material and for lowering the said drum into alinement with its frame, thereby closing and sealing the lid, and also for depressing the free end of said drum below its frame to release the lid to permit sudden opening of the same, whereby the contents of the drum are discharged therefrom.

64. The combination with a container for receiving material to be heated and adapted to be opened for purposes of discharge, of a device for releasably securing said container firmly in closed condition constructed to permit a sudden opening of the container, the materials of said container and said securing device having coefficients of expansion such that said securing device will not loosen under the effect of heat.

65. The combination with a metallic container for receiving material to be heated, and a closure therefor, of a metallic device for releasably securing said closure firmly in closed condition and adapted to permit a sudden opening of the closure, the said device having a lower coefficient of expansion than said container, whereby loosening or unsealing of the closure, when the container is heated, is prevented.

66. The combination with a metallic container for receiving material to be heated and having a closure at one end thereof, of a device for releasably securing said closure in closed position, said device being connected with the container away from the end provided with the closure and having a coefficient of expansion less than that of the container, whereby loosening of said securing device under the effect of heat is prevented.

In witness whereof, I have hereunto subscribed my name in the presence of two witnesses.

ALEXANDER P. ANDERSON.

Witnesses:
  M. R. ROCHFORD,
  ROBERT LEWIS AMES.